Figure 1:
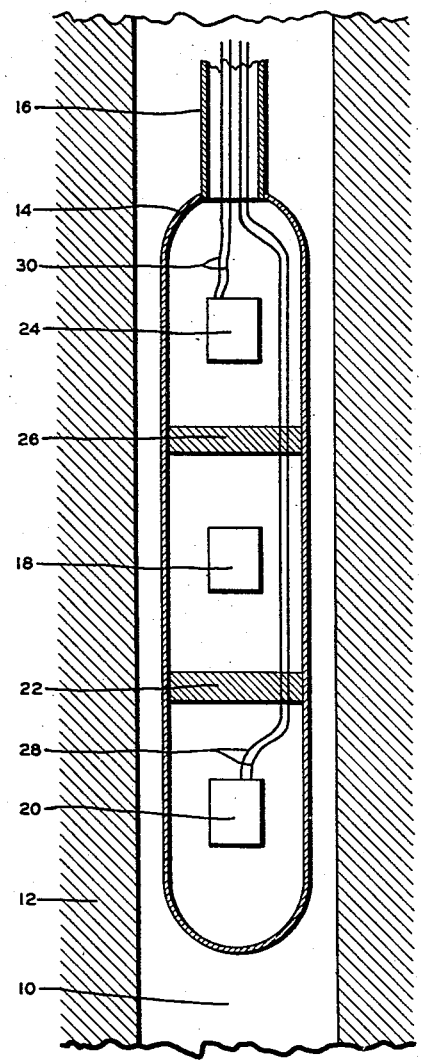

March 28, 1944.                D. G. C. HARE                2,345,119
SUBSURFACE PROSPECTING
Filed June 26, 1940

DONALD G.C. HARE
INVENTOR
BY R. J. Dearborn
Daniel Stryker
HIS ATTORNEYS

Patented Mar. 28, 1944

2,345,119

UNITED STATES PATENT OFFICE 2,345,119

SUBSURFACE PROSPECTING

Donald G. C. Hare, Houston, Tex., assignor to Texaco Development Corporation, New York, N. Y., a corporation of Delaware Application June 26, 1940, Serial No. 342,423

6 Claims. (Cl. 250—83.6)

This invention relates to the prospecting of the subsurface of the earth and more particularly to a method and an apparatus to be used in determining the nature of the formations through which a bore hole or well has been drilled. The principal object of the invention is to provide such a method and apparatus which will indicate positively and accurately the presence of hydrocarbon oil sands or oil bearing formations when the device is passed through the hole within these formations. It is also an object of the invention to provide a method which can be carried out with a minimum consumption of time and effort.

When drilling a bore hole for exploration purposes or for a well, it is of course desirable to know the depth at which are encountered those strata or formations which may contain oil in quantities of commercial interest. In the past, efforts have been made to obtain this information by various means such as the taking of core samples or side wall samples. Electrical logging methods have also been used as well as a method involving the measuring of the natural radioactive background of the formations. The taking of core samples is obviously slow and expensive and the data obtained are frequently not reliable. Electrical methods have been used in logging uncased holes but these methods are not capable of yielding any pertinent data when used in a hole having the usual metal casing. The method involving the measurement of natural radioactivity has not as yet proved to be sufficiently reliable to be commercially feasible.

In accordance with the present invention a device has been provided for making a continuous survey of a bore hole and since the operation of the device is not influenced by the presence of iron or steel in the hole, it is well adapted to the surveying of cased holes as well as those having no casing. Furthermore, the device could be used when lowered directly through a drill string or pipe.

In my co-pending application, Serial No. 337,862, filed May 29, 1940, a method and apparatus are disclosed by means of which fast neutrons are caused to be emitted and passed into the formation around the hole. Some of the neutrons after being scattered in the formation return to the surveying device to cause an indication of the variation in the types of formation through which the hole is drilled. In carrying out the present invention, a source of penetrative gamma rays which may be associated with a neutron source is lowered into the hole and these rays are scattered by the formations through which the hole has been drilled, a certain number of these rays then returning to the instrument. The instrument is provided with a suitable detector such as a Geiger-Muller counter or ionization chamber. The amount of radiation scattered back to the instrument will vary with the type of formation adjacent the instrument according to well known physical laws and thus by measurement of the intensity of this scattered radiation information may be obtained as to the nature of the formations.

Figure 2:
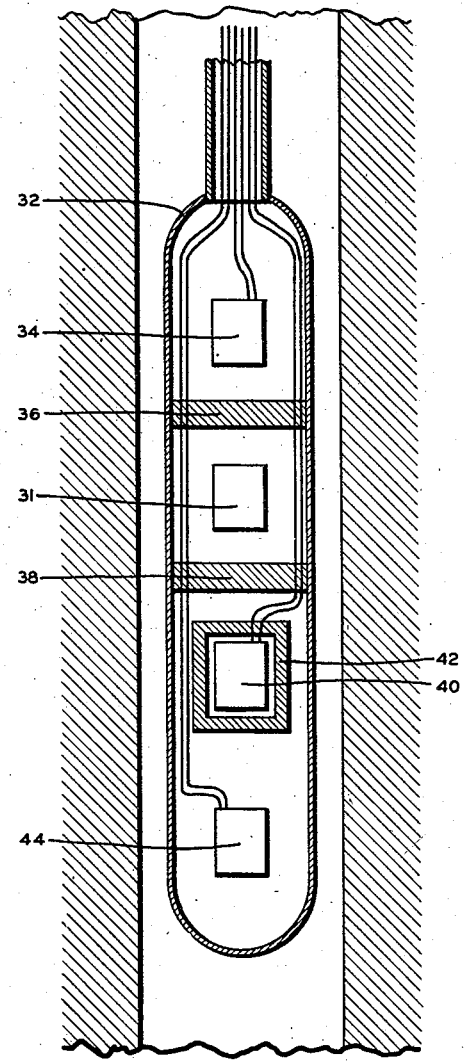

For a better description of the invention, reference may be had to the accompanying drawing in which Figure 1 is a vertical sectional elevation through a portion of a bore hole showing an instrument embodying one form of the invention, and Figure 2 is a similar elevation showing the instrument as embodied in a modified form.

Referring to the drawing, a bore hole 10 is shown as having been drilled through a formation 12. The surveying instrument comprises a substantially closed casing 14 of any suitable material adapted to be lowered and raised through a hole 10 by means of a string of tubing 16 or other suitable means such as a wire line or cable. Disposed within the casing 14 is a suitable source 18 of gamma rays and neutrons. The source 18 may be a tube or other suitable container in which is sealed a mixture of a small amount of a radium sulfate or chloride and a considerably larger quantity of finely powdered beryllium metal. A detector 20 adapted for the detection of gamma rays only is disposed within the casing 14 and is separated from the source 18 by means of a suitable shield 22 of lead. The detector 20 used for detecting gamma rays to the exclusion of neutrons may be such a device as a Geiger-Muller tube, operated at a potential sufficiently high so that the electrons emitted by the interaction of a gamma quantum with the tube wall will cause the tube to discharge. Within the upper part of the casing 14 may be disposed a detector 24 adapted for the detection of neutrons only and this detector is also separated from the source 18 by means of a shield 26. It is understood, of course, that the shields 22 and 26 tend to prevent direct radiation from the source 18 from reaching the detectors 20 and 24. The shield 26 for preventing neutrons from passing directly from the source to the detector may, if the detector is such as to respond to slow neutrons only, be a sheet of cadmium or other substance or a combination of cadmium and boron having a high capture cross-section for slow neutrons. Or, if desired to have the detector respond to both fast and slow neutrons, it may consist of, say, 10 to 20 cm. of a hydrogenic material such as paraffin, for slowing down the neutrons, followed by a layer of cadmium or other substance as described above. Such a thickness of paraffin will slow down practically all the neutrons to an energy suitable for their capture by a cadmium shield. The detectors 20 and 24, which, as before stated, may be Geiger-Muller counters or ionization chambers or other detectors such as are well known to those versed in the art, are connected to suitable indicating or recording instruments, not shown, at the surface by means of wires 28 and 30 respectively.

In operation the instrument is lowered through a cased or uncased bore hole, preferably at a uniform speed, and gamma rays emitted from the source 18 penetrate the formation surrounding the hole. These rays will be scattered within the formation and some will return to the detector 20. Since the number of gamma rays scattered per unit volume will depend on certain physical properties such as density and atomic number of the substances making up the formation, by measuring the number of such gamma rays scattered back to the detector 20 we can obtain valuable information concerning the nature of the formation adjacent to the instrument. Thus, as the device is moved along the bore hole from point to point changes will be noted in the intensity of the gamma rays scattered back to the detector 20, and these changes may be correlated with the types of formations through which the bore hole has been drilled. In this manner a continuous survey may be made of a bore hole and, as pointed out hereinbefore, since the gamma rays are little influenced by the presence of iron or steel in the hole, the device can be used with success in the logging of holes containing casing or drill pipe.

If desired, the source 18 may be such as will emit both gamma rays and fast neutrons, and in this case the detector 24 will pick up those neutrons which are scattered and returned to the instrument in a manner similar to that in which the detector 20 picks up the returning gamma rays, but with this arrangement additional information may be obtained such as the presence or absence of hydrogenic substances in the structure of the formations through which the hole has been drilled. This will be particularly true if the detector 24 is capable of differentiating between fast and slow neutrons, thus detecting those which have been slowed down by collision with hydrogen nuclei. Such a detector may be a boron-trifluoride ionization chamber.

According to well known quantum mechanical considerations, the penetrating power or hardness of the gamma radiation may be affected in the scattering process. Since the scattering is to some extent dependent upon the nature of the formation penetrated, this change in penetrating power may be used to obtain additional information as to the nature of the formation.

Figure 2 shows an arrangement for detecting this change in penetrating power. In this modification 31 is a source of gamma rays or neutrons or preferably of both, and disposed above the source 31 within the casing 32 is a detector 34 adapted to detect scattered neutrons. The source 31 is separated from the detector 34 by means of a suitable lead shield 36. Below the source 31 and separated therefrom by means of another shield 38 is a detector 40 suitable for detecting gamma rays mainly, and this detector is surrounded by a shield 42 which may consist of a layer of any substance such as lead which has the property of selectively absorbing gamma radiation. By "selective absorbing" is meant absorption which is a function of the wave length or hardness of the radiation. A detector 44 of gamma rays and similar to the detector 40 is arranged in the lower portion of the casing 32 and the detector is not surrounded by any shield. Preferably, the two detectors or counters 40 and 44 are placed in near coincidence and thus receive essentially the same intensity of scattered gamma radiation. The shield 42 around the detector 40 will, however, decrease the intensity of the less penetrating gamma radiation and thus permit the detector 40 to record principally the radiation which has been least affected by the scattering process. By comparing the intensity registered by the detectors 40 and 44 it is possible to obtain information regarding the scattering processes and thus of the type of formation doing the scattering. It is of course possible to use several detectors or counters similar to 44, each one shielded with a different thickness of an absorbing material, and thus make a more precise determination of the alteration of the penetrating power Obviously many other modifications and variations of the invention as hereinbefore set forth may be made without departing from the spirit and scope thereof, and therefore only such limitations should be imposed as are indicated by the appended claims.

I claim:

1. The method of investigating the formation around a bore hole which comprises lowering through the hole a source of gamma rays and neutrons, detecting the gamma rays scattered in the formation and returned to the hole to determine the density and atomic number of the formations surrounding the hole and simultaneously and separately detecting the neutrons scattered in the formation and returned to the hole to determine the presence in the formation of substances containing hydrogen.

2. The method of logging the formation surrounding a bore hole which comprises passing through said hole a source of penetrative gamma rays whereby these gamma rays will enter and be scattered in the formation, accompanying said source with a pair of devices for detecting gamma rays emitted from said source and returned to the hole after being scattered in the formation, one of said detecting devices being surrounded with a layer of a substance having the property of selectively absorbing gamma radiation, and observing the amounts of scattered radiation picked up by said detecting devices as the source and detecting devices are passed continuously through the hole.

3. The method of logging the formation surrounding a bore hole which comprises passing through said hole continuously a source of penetrative gamma rays whereby the rays will penetrate and be scattered in the formation, detecting gamma rays scattered in the formation and returned to the hole, simultaneously separately detecting those rays scattered in the formation and which are less affected by the scattering process than the first-mentioned rays comparing the intensities of the rays detected and determining from the relative intensities the type of formation causing the scattering of the rays.

4. The method of logging the formation surrounding a bore hole which comprises passing through said hole continuously a source of penetrative gamma rays whereby the rays will penetrate and be scattered in the formation, simultaneously detecting gamma rays scattered in the formation and returned to the hole by means of two adjacent detecting devices, shielding one of said detecting devices by a layer of a substance, such as lead, capable of selectively absorbing gamma radiation, comparing the intensities of the scattered radiation detected by said two devices, and determining from the relative intensities detected the nature of the formation causing the scattering of the rays.

5. A device for logging the formation surrounding a bore hole which comprises a casing, means for lowering and raising said casing through said bore hole, a source of penetrative gamma rays and neutrons in said casing, a device in said casing for detecting gamma rays emitted from said source and scattered within the formation, a device in said casing for detecting neutrons emitted from said source and scattered within the formation and shield members disposed between said source and each of said detecting devices.

6. A device for logging the formation surrounding a bore hole which comprises a casing, means for lowering and raising said casing through said bore hole, a source of penetrative gamma rays and neutrons in said casing, a device in said casing for detecting gamma rays emitted from said source and scattered within the formation, a second device in said casing for detecting scattered gamma rays, a layer of a substance capable of selectively absorbing gamma radiation disposed around said second device, and a third device in said casing for detecting neutrons scattered in the formation and returned to the hole.

DONALD G. C. HARE.